Sept. 21, 1965 T. W. ROGERSON 3,207,933
INTERVAL TIMER
Filed Aug. 23, 1962 2 Sheets-Sheet 2
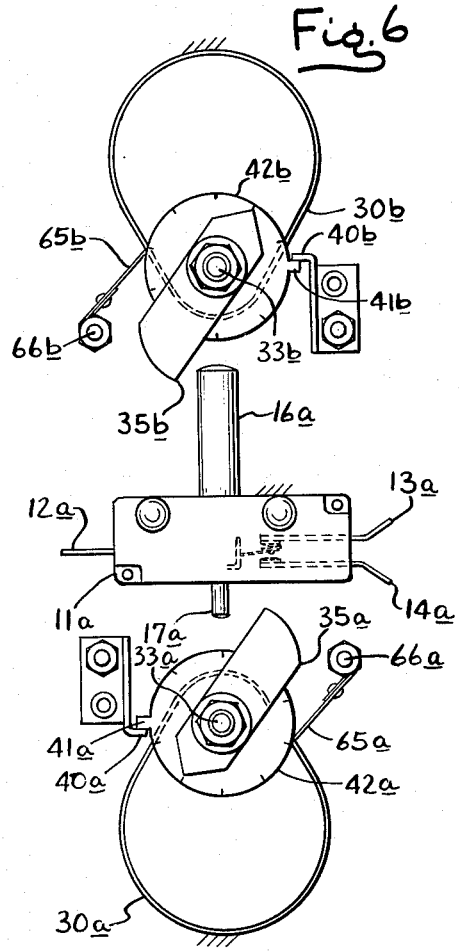
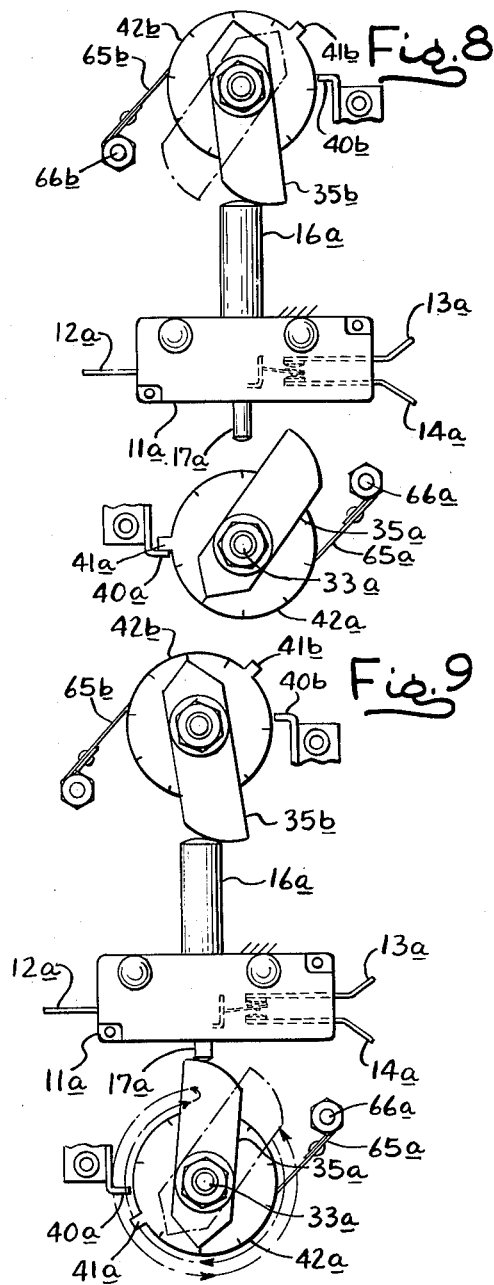
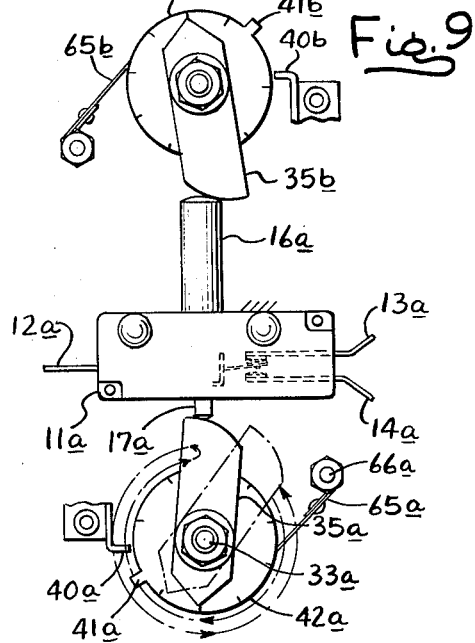
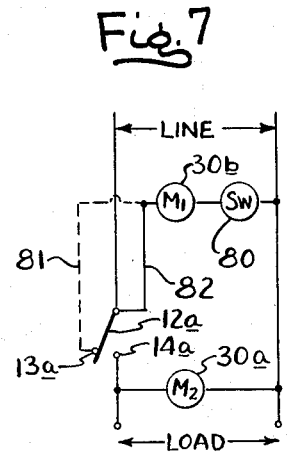
INVENTOR.
THOMAS W. ROGERSON
BY
ATTY.

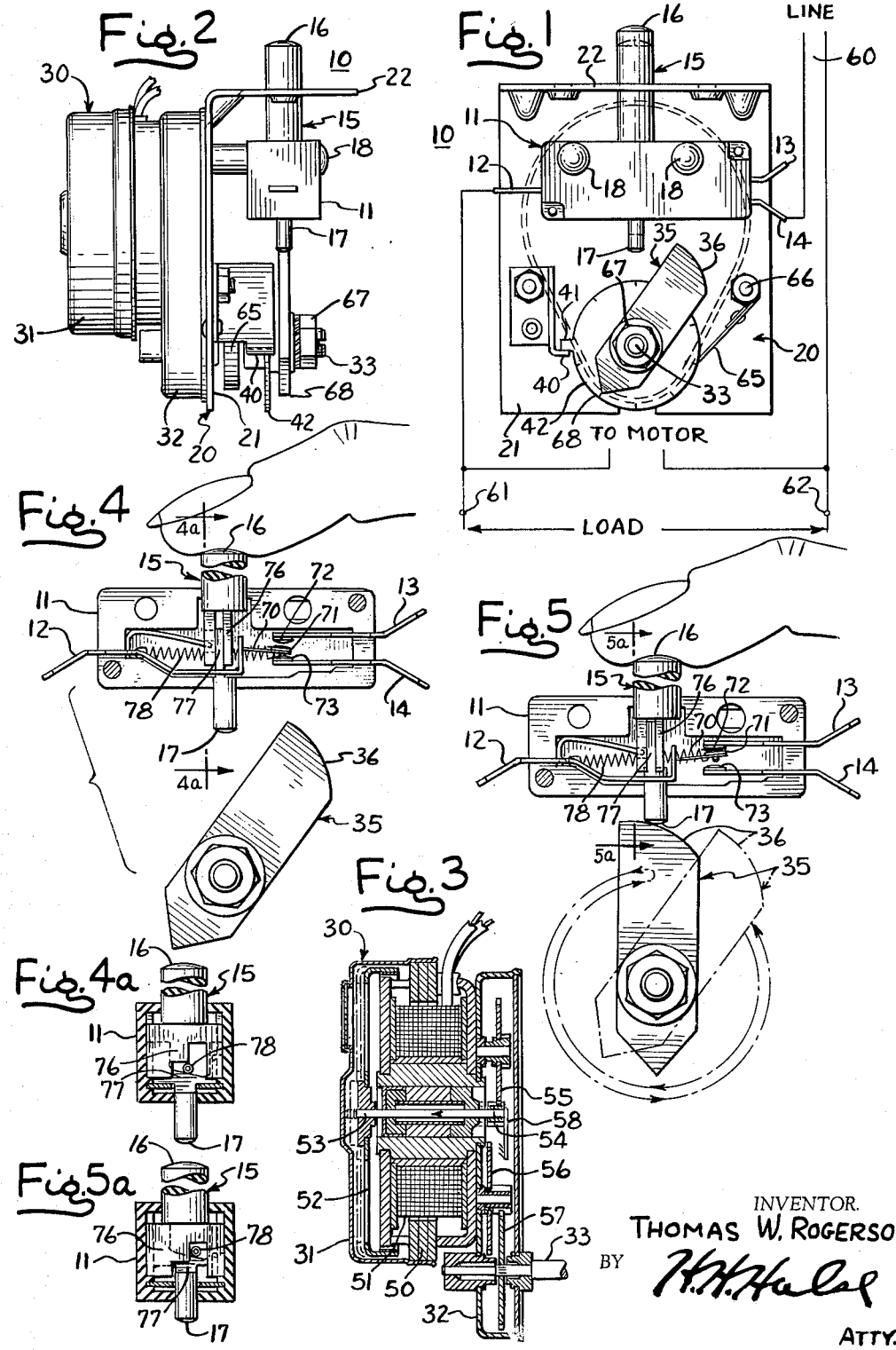

United States Patent Office 3,207,933
Patented Sept. 21, 1965

3,207,933
INTERVAL TIMER
Thomas W. Rogerson, Harwinton, Conn., assignor to General Time Corporation, New York, N.Y., a corporation of Delaware
Filed Aug. 23, 1962, Ser. No. 218,966
4 Claims. (Cl. 307—141)

The present invention relates to time switches and particularly to an improved interval timer employing a synchronous driving motor.

It is an object of the present invention to provide an improved interval timer which is accurate and reliable, which overcomes the shortcomings of conventional interval timers but which is nevertheless simple and inexpensive. It is another object of the invention to provide an interval timer which is particularly suitable for use in devices requiring a timed cycle and used by the general public, such as hand dryers, vending machines, and the like, actuated by a pushbutton to start the interval but where accurate measurement of the interval cannot be defeated by maintaining the pushbutton depressed. It is a more specific object to provide an interval timer of the resetting type capable of restoring itself to an initial condition after the switching cycle is completed and which is capable, in addition, of returning to the initial condition upon interruption of the supply current. Consequently it is an object to provide an interval timer which may be used with advantage as a safety timer capable of turning off associated apparatus if such apparatus employs more than a predetermined amount of time to complete its cycle and which thereby indicates that a malfunction has occurred.

In another aspect of the invention it is an object to provide an interval timer which is capable of accurately measuring a time interval following an initial, timed, delay interval. In this connection it is an object to provide a "double interval" timer which is capable of defining an accurate time interval of short duration following an initial interval of much longer duration, for example, an interval of a few seconds in length following an interval of many hours duration. Thus it is an object to provide an interval timer which is highly flexible in use and in which a single switch element may be used in association with either one or two timing motors to provide safe, accurate and defeat-proof operation for a wide variety of applications requiring an interval measurement which may vary over wide limits from seconds to days in length.

Other objects and advantages of the invention will become apparent upon reading the attached detailed description and upon reference to the drawings in which:

FIGURE 1 is a face view of a timer constructed in accordance with the present invention.

FIG. 2 is a side view of the timer shown in FIG. 1.

FIG. 3 is a vertical section taken through the motor shown in FIG. 2.

FIG. 4 is a longitudinal section taken through the switch mechanism showing the effect of pressing the main switch plunger.

FIG. 4a is a transverse section taken along the line 4a—4a in FIG 4.

FIG. 5 is a view similar to FIG. 4 but showing automatic restoration of the switch following the timed interval.

FIG. 5a is a transverse section taken along the line 5a—5a in FIG. 5.

FIG. 6 is a face view of a modified switch employing a pair of timing motors to operate a common plunger assembly for the timing of successive intervals.

FIG. 7 is a schematic circuit diagram applicable to the timer of FIG. 5.

FIGS. 8 and 9 are stop motion diagrams showing the position of the parts upon termination of the first and second intervals respectively.

While the invention has been described in connection with certain preferred embodiments, it will be understood that the invention is not limited to the particular embodiments but that it is intended to cover the various alternative and equivalent constructions included within the spirit and scope of the appended claims.

Turning now to the drawings, an interval timer indicated generally at 10 includes a switch 11 having a common terminal 12, a normally closed terminal 13 and a normally open terminal 14. Extending centrally through the switch housing is a plunger assembly 15 having upper and lower ends 16, 17 respectively. The ends of the plunger assembly may be referred to for convenience as plunger "elements." The switch is provided with mounting screws 18 for mounting the same on an L-shaped mounting plate 20. The latter, which may be formed of a sheet of metal, has a base portion 21 and a bent over flange portion 22 through which the end 16 of the plunger may project. Reference will be made during the course of the discussion to the internal construction and operation of the switch 11. It will suffice, for the present, to say that when pressure is applied to the upper end 16 of the plunger, for example, by pressing it in the manner of a manual pushbutton, the plunger moves downwardly thereby turning on the switch and with the plunger and contacts being held in the "on" position by a suitable detent. Conversely when pressure is applied to the lower end 17 of the plunger assembly, the plunger is restored and the switch is turned off.

In carrying out the present invention a timing motor suitably geared down and carrying a cam at its output is provided for engaging the plunger and restoring the switch to the off condition. In the present instance the timing motor assembly, indicated generally at 30, includes an a.-c. motor 31 having a gear box 32 and an output shaft 33. Connected to the output shaft is a cam 35 having a cam surface 36 at the end thereof alined with the end of the plunger 17. For the purpose of establishing a reference position for the cam 35, a stop 40 is provided which is arranged in the path of movement of an arm 41, the latter being formed integral with a disc 42 which is rigidly secured to the output shaft 33.

In practicing the present invention the motor is preferably of the type having a clutch interposed between the output shaft and the rotor and preferably at a high speed position in the driving train, with the clutch so constructed and arranged that it is in engagement as long as the motor is energized and disengaged at all other times. For the details of construction of such a motor and clutch, reference is made to Schellens Patent 2,334,040. For convenience, the salient features are set forth in FIG. 3. Here it will be noted that the motor includes a stator 50 having a winding 51 for driving a rotor 52 mounted upon a shaft 53. The shaft carries a pinion 54 at its end engaging a first gear 55. Additional step down gears, two of which are shown at 56, 57 complete the drive train terminating in the slowly rotating shaft 33. The motor is so constructed that the rotor is movable toward and away from the stator to provide engagement and disengagement between the motor pinion 54 and the first gear 55. A spring 58 pressing upon the rotor shaft urges the rotor away from the stator for disengagement, or unclutching, of the pinion 54. Thus when the motor winding is deenergized, the spring 58 is effective to move the rotor to the dot-dash position accompanied by unmeshing of the pinion 54. However, when the motor is energized the rotor is magnetically sucked to the operating position shown accompanied by inward movement of the rotor shaft and meshing of the rotor pinion 54. This starts the cam 35 rotating from the reference position shown so that, after a predetermined time interval which depends upon the ratio of the motor driving train, the cam surface 36 wipes against the lower end 17 of the plunger assembly causing the plunger assembly to be restored to its upwardly extending position and turns off the switch.

In accordance with one of the aspects of the present invention, the switch is connected to a current source, for example, the regular commercial supply line 60 for controlling energization of a load circuit having terminals 61, 62 which supply current to the controlled device. The motor winding is, as shown, connected across the load circuit. Thus, when the plunger 15 of the switch occupies its upwardly extended position, with the switch turned off, no current is supplied to the load terminals 61, 62 and the motor is stationary with the cam 35 occupying the reference position. When the upper end of the plunger is pressed, for example, manually, the plunger moves down to the dotted position turning on the switch and energizing the load together with the timing motor. The clutch is automatically engaged and the cam 35 rotates, over a timed interval, into a position in which it engages the lower end 17 of the plunger, wiping the plunger upwardly to its initial position and turning off the switch, thereby deenergizing the load and the motor. Means are provided for restoring the cam 35 to its initial reference position in readiness for a subsequent operating cycle. In the present instance this restoring means includes a coil spring 65 which is anchored to the frame 66 and which is connected at its inner end to the shaft 33.

For the purpose of varying the "on" timer interval, the cam 35 is preferably mounted on the shaft 33 so that its phase or starting position may be varied. Conveniently, the cam may be secured by a nut 67 and an associated lock washer. The disc 42 previously referred to and which is rigidly mounted on the shaft 33 may be calibrated directly in terms of time interval for cooperation with a pointer 68 formed on the cam member opposite the cam surface 36.

In accordance with one of the features of the present invention, the switch is preferably so constructed with the plunger 15 in two separate sections so that the lower end 17 of the plunger is effective to turn the switch off notwithstanding maintenance of pressure upon the upper end 16 of the plunger. In short, the lower or restoring end of the plunger is effective to overpower, or take over control from, the upper end.

The details of construction and operation of the switch per se do not constitute a part of the present invention. Accordingly, it will suffice, for present purposes, to refer to FIGS. 4 and 5 which show longitudinal sections taken through the switch under two conditions. Thus the common contact 12, as will be seen, is internally connected to an overcenter contact blade 70 which carries a contact 71 while the normally closed and normally open terminals are connected to stationary contacts 72, 73 respectively. The two portions 16, 17 of the plunger are connected to relatively slidable plates 76, 77 which act upon a coil spring 78 which is anchored at one end to the switch housing and connected at the other end to the movable contact member 70.

In a typical operation, pressure upon the upper end 16 of the plunger (see especially FIG. 4a) causes the spring 78 to be carried downwardly, overcenter, with resulting contact between the movable contact element 71 and the stationary contact 73 so that contact is made between terminals 12, 14 of the switch. This energizes the load circuit and starts the timing motor as noted above, with the cam 35 being driven clockwise as viewed in FIG. 5 and in the direction of the lower end 17 of the plunger. When, after the predetermined time interval, the cam engages the end 17 of the plunger, the upper edge of the member 77, which is angled as shown, engages the coil spring 78 causing it to be cammed laterally out of the way of the member 77 and followed by upward, overcenter, movement of the coil spring thereby opening the contacts 71, 73 and turning off the switch. Such upward movement of the coil spring 30 takes place even though, as indicated at FIG. 5, pressure is maintained on the upper end 16 of the switch plunger. With the motor thus deenergized, unclutching takes place so that the cam 35 and motor gear train are rotated counterclockwise under the urging of the restoring coil spring 65 thereby to restore the cam to its initial position in readiness for a subsequent cycle.

It will be apparent to one skilled in the art that the above device finds particular utility in connection with machines which may be operated by the general public, as, for example, hand dryers, vending machines, and the like. In the case of a hand dryer, for example, it is desired that the heating element and associated blower be turned on for a definite time interval and that the operator should not be able to affect such time interval. The operation is properly initiated by pressing the upper end of the switch plunger which may terminate in a pushbutton. Since the switch mechanism is detented, only momentary pressure is necessary to start the cycle. In the event that the user maintains pressure upon the plunger, as has been seen in connection with FIG. 5, the cam 35, timing out the cycle, is effective, nonetheless, to deenergize the heater and blower circuit. In order to begin a separate cycle it is, therefore, necessary that the plunger shall be released and re-pressed.

The above, however, is but one example of the use of the present interval timer. If desired the timer may be employed as a safety element in an automatic device where the operating cycle is normally completed at a certain time and where delay in completion of the cycle is indicative of malfunction, thereby to insure turn-off until the malfunction can be corrected by a qualified service man. For example, in the case of an oil burner, a certain time interval is allowed for lighting the flame and if the flame is not lit the unit should, for safety's sake, be disabled so that oil does not continue to be discharged. Similarly in the case of currency changing machines, the machine should act within a predetermined time interval to make the change and any delay beyond such time interval is a symptom that the machine is being tampered with and hence should be shut down. When using the present interval timer as a safety device the switch plunger is normally in a depressed condition with the switch being turned on and the input lines 60, instead of being permanently connected to the commercial supply line are connected, instead, to the cycled equipment. Thus, for example, when a light cycle starts in the case of an oil burner the timing motor 30 is energized so that the cam 35 begins to rotate. The interval is so adjusted as to be slightly longer than the lighting cycle. Thus lighting will normally take place prior to the time that the switch is operated by the cam. In short, the timing motor 30 will be normally deenergized before actual contact between the cam 35 and the lower end 17 of the plunger so that the cam will simply be restored, by the restoring spring 65, to its reference position. However, in the event that the lighting cycle takes an excessive amount of time, the cam 35 will complete its full travel, engaging the end 17 of the plunger, turning off the switch and removing voltage from the output terminals 61, 62 which may be, for example, connected to a valve in series with the oil supply line so that no further oil can flow. In any event, the protective equipment is disabled and the plunger must be manually re-pressed in order to restore it to operation. Preferably the device is enclosed so that such restoration can be made by a qualified repairman.

While the invention has been described above in connection with a single timing motor assembly, it is proposed in accordance with one of the aspects of the invention that separate motor assemblies be provided by actuating the respective ends of the plunger thereby to define two time intervals, an initial interval and a final interval. Such operation may be desirable where, for example, it is desirable to turn on equipment for a certain time interval following a predetermined "off" interval. It is one of the features of the present device that the "on" time may be quite short and controlled with a high degree of accuracy and superimposed upon a more lengthy "off" interval. Just by way of example, controlled equipment may be turned on for a period of twenty seconds once each day, or say, once each week. The arrangement employed for accomplishing this is set forth in FIG. 6, with the electrical circuit being shown in schematic form in FIG. 7. Here it will be noted that the switch 11a has a common contact 12a and alternatively energized contacts 13a, 14a. For the purpose of operating the lower end 17a of the plunger, a motor assembly 30a is provided driving a shaft 33a which is connected to a cam 35a. The cam is biased toward a reference position by a return spring 65a. The elements mentioned correspond to similar elements in the earlier described embodiment. In accordance with the invention a second motor assembly 30b having a shaft 33b and driving a cam 35b is positioned opposite the upper end of the plunger. The motor assembly 30b corresponds to that shown at 30a except that it may employ a different gear ratio to define a different, for example longer, time interval. The cam 35b is biased toward a reference position by a return spring 65b.

Means are provided for energizing the motor assembly 30b from the supply line, for example, through a switch 80 (FIG. 7) while the second motor is connected across the load terminals indicated at 61a, 62a.

Referring to FIGS. 8 and 9, the operation of this embodiment will be understood as follows. Closure of the switch 80 causes the cam 35b to rotate from the dotted position shown in FIG. 8 to the full position. This may take a period of hours or days depending upon the choice of time interval. When the cam 35b reaches the end of its stroke it applies pressure to the upper end 16a of the switch plunger, thereby closing the contacts 12a, 14a and energizing the load circuit. This turns on the motor assembly 30a so that the cam 35a is driven from its reference position from the dotted position in FIG. 9 to the solid position at which time the lower end 17a of the plunger is engaged causing the contacts within the switch to be opened as previously discussed in connection with FIGS. 5, 5a. This causes the load circuit to be deenergized, deenergizing the motor assembly 30a and causing the cam 35a to be restored to its dotted reference position. It is to be particularly noted that when employing the non-defeat switch construction set forth in the above-identified application and in FIGS. 4 and 5 thereof, the switch contacts are opened and the load is turned off notwithstanding the fact that the cam 35b associated with the motor assembly 30b may still be in contact with the upper end of the switch plunger. This insures that the cams of the two timing motors will never be in a condition where one physically must work against the other and where a condition of binding or jamming may be set up. Thus the timing device disclosed in FIG. 6 is capable of providing successive timed intervals with a high degree of reliability and with no possibility of malfunction. Where it is desired that the successive cycles be repeated over and over again on a continuous basis, the circuit to the first motor assembly may be completed through the normally closed switch contacts. Thus the dotted lead 81 may replace the lead 82 of the circuit. Under such conditions the operation is as follows: Turning on the control switch 80 causes the motor assembly 30b to be energized through the normally closed contacts, rotating the cam 35b into engagement with the upper end of the plunger 16a and operating the switch. This accomplishes two purposes. In the first place the normally closed terminal 13a is opened thus deenergizing the motor assembly 30b so that the cam 35b is free to be restored to its reference position under the urging of the biasing spring 65b. At the same time, the energization of the normally open terminal 14a turns on the motor assembly 30a, and the load, so that the cam 35a rotates around, over a predetermined time interval, into engagement with the lower end 17a of the plunger assembly. Upward movement of the plunger assembly restores the contacts to the initial condition shown in FIG. 7, turning off the motor assembly 30a and turning on the motor assembly 30b to initiate another complete cycle. Since the plunger is always actuated at a predetermined point in the course of movement of the controlling cam 35a, 35b, and since the switch reacts with prompt snap action, the cycle may be timed with a high degree of accuracy and will tend to remain substantially in synchronism, without care, attention or adjustment, over long periods.

It will be apparent to one skilled in the art that the above embodiments, while providing reliable non-defeat operation may nevertheless be constructed at low cost employing available or easily manufactured components.

Use of a motor having a self-contained automatic clutch is advantageous in the present device since it permits the time interval, or intervals, to be readily adjustable. That is, it permits the actuating cams to be restored back to their reference position after traversing and desired, preset angle. However, the invention in one of its aspects is not necessarily limited to use of a clutch-type motor and, if easy adjustabilty is not important, conventional motor and gear trains may be employed. Where this is done the cam, for example, the cam shown at 35 in FIG. 1, may be permanently secured to the output shaft 33 of the motor unit and the disc 42, stop 40 and return spring 65 may be eliminated. In such simplified modification of the present structure use is made of the fact that a conventional timer motor and gear unit tends to coast after being deenergized. The cam 35 is adjusted so that operation of the switch takes place just as the cam is about to clear the plunger 17. Thus in a typical cycle the cam 35, starting from a reference position just clear of the lower end of the plunger, makes a complete timed revolution, engaging the plunger and turning off the switch 11 during the last few degrees of the revolution. This deenergizes the motor but since the motor has momentum, the cam will coast clear of the lower end of the plunger, permitting the upper end 16 of the plunger to be manually reactuated to set in motion a new cycle.

It will be understood in the following claims that the term "plunger," "plunger assembly" and "plunger element" are not limited to switch actuating elements having the particular cylindrical shape shown but shall be deemed to include switch actuators of other geometric shape but performing the same switching function.

Moreover, the term "cam" used in the claims will be understood to refer to either one of a pair of cammingly engageable elements.

I claim as my invention:

1. A pushbutton-actuated interval timer comprising, in combination, a switch having a set of detented contacts together with a first plunger element having means for coupling the same to the contacts for turning the contacts "on" and a second plunger element including means for coupling the same to the contacts for positively turning the contacts "off," a source of current, a load circuit in series with the contacts for receiving current from the source, a timing motor connected across the load circuit, said timing motor having a rotor and an output shaft and a clutch interposed therebetween, means for engaging the clutch as long as the motor is energized but maintaining the clutch disengaged at all other times, a cam on the output shaft positioned to engage the second plunger element in the course of its timed rotation, means for establishing a reference position for the cam, and means for biasing the cam into such reference position thereby to define a predetermined time interval between the moment that the motor is energized and the moment that the second plunger element is engaged followed by return of the cam to its reference position in readiness for a subsequent timing cycle.

2. A pushbotton-actuated interval timer in accordance with claim 1 in which a stop is provided on the shaft for defining a reference position and in which the cam has means for adjustably positioning it on the shaft relative to the stop.

3. An interval timer comprising, in combination, a switch having a set of contacts together with a first plunger element having means for coupling the same to the contacts for turning the contacts "on" and a second plunger element having means for coupling the same to the contacts for turning the contacts "off," first and second timing motors, each of said timing motors having a rotor and an output shaft with a clutch interposed between the rotor and output shaft as well as means for engaging the clutch during the time that the motor is energized, cams on the respective output shafts, each of said shafts having a stop for defining a reference position as well as a return spring for biasing the shaft against its stop, a source of current, a load circuit in series with the contacts for receiving current from the source, said first and second timing motors being so positioned relative to the switch so that the cams thereon engage the respective plunger elements during the course of cam rotation from the reference positions, means for connecting the first motor to the current source so that the first plunger element is actuated after a first timed interval to close the contacts and thereby energized the load circuit, said second motor being connected to the load circuit so that the second plunger element is actuated after a second timed interval to de-energize the load circuit.

4. An interval timer in accordance with claim 3 in which the means coupling the second plunger element to the contacts provides a direct mechanical connection so that the contacts are turned "off" upon actuation of the second plunger element notwithstanding the position of the first plunger element.

References Cited by the Examiner
UNITED STATES PATENTS 2,943,159 6/60 Goodhouse et al. _____ 200—39
3,053,946 9/62 Greenwald _____ 200—35

LLOYD McCOLLUM, *Primary Examiner.*

BERNARD A. GILHEANY, *Examiner.*